United States Patent
Miyagi et al.

(10) Patent No.: US 10,346,426 B2
(45) Date of Patent: Jul. 9, 2019

(54) SYSTEM-REPLICATION CONTROL APPARATUS AND SYSTEM-REPLICATION CONTROL METHOD

(71) Applicant: FUJITSU LIMITED, Kawasaki-shi, Kanagawa (JP)

(72) Inventors: Koyo Miyagi, Ota (JP); Hideki Sakurai, Kawasaki (JP); Masanori Kimura, Mishima (JP); Kei Ohishi, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 15/212,613

(22) Filed: Jul. 18, 2016

(65) Prior Publication Data

US 2017/0046414 A1 Feb. 16, 2017

(30) Foreign Application Priority Data

Aug. 10, 2015 (JP) .................................. 2015-158536

(51) Int. Cl.
*G06F 16/27* (2019.01)
*H04L 29/08* (2006.01)

(52) U.S. Cl.
CPC .......... *G06F 16/27* (2019.01); *H04L 67/1095* (2013.01)

(58) Field of Classification Search
CPC . G06F 17/30575; G06F 16/27; H04L 67/1095
USPC ....................................................... 707/634
See application file for complete search history.

(56) References Cited

U.S. PATENT DOCUMENTS

| | | | | |
|---|---|---|---|---|
| 5,867,214 A | * | 2/1999 | Anderson | H04N 1/2112 348/231.6 |
| 6,016,503 A | * | 1/2000 | Overby, Jr. | G06F 9/50 370/229 |
| 8,032,523 B2 | * | 10/2011 | Hamilton, II | G06F 1/3203 707/720 |
| 8,095,929 B1 | * | 1/2012 | Ji | G06F 9/4856 709/223 |
| 8,489,744 B2 | * | 7/2013 | Elyashev | H04L 67/1002 709/226 |

(Continued)

FOREIGN PATENT DOCUMENTS

| | | | | |
|---|---|---|---|---|
| CN | 103607459 A | * | 2/2014 | |
| EP | 2028592 A1 | * | 2/2009 | G06F 9/4856 |

(Continued)

OTHER PUBLICATIONS

Boru et al., "Energy-Efficient Data Replication in Cloud Computing Datacenters," CCSNA Workshop at Globecom, Dec. 2013, 7 pages. (Year: 2013).*

(Continued)

*Primary Examiner* — Phuong Thao Cao
(74) *Attorney, Agent, or Firm* — Fujitsu Patent Center

(57) ABSTRACT

A system-replication control apparatus includes a processor that executes a process. The process includes: monitoring a use state of a resource in each of data centers; storing facility information indicating resources respectively held by the data centers and a use cost of the resources, and replication condition applied when each system is replicated in a resource of another data center; and selecting a resource composition that satisfies the replication condition and that costs lower than a currently-selected resource, as a replication destination of the system, from among available resources by referring to the use state of the resource obtained at the monitoring and the facility information.

7 Claims, 16 Drawing Sheets

(56) References Cited

U.S. PATENT DOCUMENTS

| | | | |
|---|---|---|---|
| 8,504,556 B1* | 8/2013 | Rice | G06F 17/3056 707/713 |
| 8,510,295 B1* | 8/2013 | Dayan | G06F 17/30244 707/652 |
| 8,782,008 B1* | 7/2014 | Xing | G06F 17/30575 707/660 |
| 8,903,983 B2* | 12/2014 | Bakman | G06F 11/008 703/13 |
| 8,954,592 B1* | 2/2015 | Cormie | H04L 47/783 709/225 |
| 8,966,495 B2* | 2/2015 | Kulkarni | G06F 9/45558 718/105 |
| 9,003,003 B1* | 4/2015 | Hyser | H04L 29/06 700/35 |
| 9,172,588 B2* | 10/2015 | Kalyanaraman | H04L 29/08954 |
| 9,274,710 B1* | 3/2016 | Oikarinen | G06F 3/061 |
| 9,311,374 B2* | 4/2016 | Darcy | G06F 17/30575 |
| 9,378,056 B2* | 6/2016 | Oda | G06F 9/5088 |
| 9,495,211 B1* | 11/2016 | Helstroom | G06F 9/50 |
| 9,619,297 B2* | 4/2017 | Jain | G06F 9/5088 |
| 2002/0194342 A1* | 12/2002 | Lu | H04L 29/06 709/227 |
| 2004/0034672 A1* | 2/2004 | Inagaki | G06F 11/1464 |
| 2004/0143664 A1* | 7/2004 | Usa | G06F 9/5077 709/226 |
| 2004/0194055 A1* | 9/2004 | Galloway | G06F 9/4875 717/101 |
| 2007/0109981 A1* | 5/2007 | Hirano | H04W 48/16 370/310.2 |
| 2007/0240160 A1* | 10/2007 | Paterson-Jones | G06F 8/60 718/104 |
| 2008/0028009 A1* | 1/2008 | Ngo | G06F 11/2097 |
| 2008/0059557 A1* | 3/2008 | DeSantis | G06F 9/5044 709/201 |
| 2008/0172312 A1* | 7/2008 | Synesiou | G06Q 10/00 705/34 |
| 2008/0239981 A1* | 10/2008 | Kanda | H04L 41/0896 370/252 |
| 2009/0055507 A1* | 2/2009 | Oeda | G06F 9/4856 709/216 |
| 2009/0099905 A1* | 4/2009 | McDonald | G06Q 10/04 705/7.25 |
| 2009/0144393 A1* | 6/2009 | Kudo | G06F 9/5044 709/218 |
| 2009/0210527 A1* | 8/2009 | Kawato | G06F 9/45558 709/224 |
| 2009/0276771 A1* | 11/2009 | Nickolov | G06F 9/4856 717/177 |
| 2009/0300173 A1* | 12/2009 | Bakman | G06F 11/008 709/224 |
| 2010/0082355 A1* | 4/2010 | Folk | G06Q 30/0202 705/1.1 |
| 2010/0082549 A1* | 4/2010 | Hollingsworth | G06F 17/3056 707/665 |
| 2010/0083285 A1* | 4/2010 | Bahat | G06F 17/30997 719/328 |
| 2010/0115509 A1* | 5/2010 | Kern | G06F 1/3203 718/1 |
| 2010/0217631 A1* | 8/2010 | Boss | G06Q 10/06 705/7.22 |
| 2010/0241751 A1* | 9/2010 | Sonoda | G06F 9/50 709/226 |
| 2010/0332889 A1* | 12/2010 | Shneorson | G06Q 10/04 714/2 |
| 2011/0161496 A1* | 6/2011 | Nicklin | G06Q 30/06 709/226 |
| 2011/0225121 A1* | 9/2011 | Cooper | G06F 17/30578 707/634 |
| 2012/0079175 A1* | 3/2012 | Flynn | G11C 7/1012 711/103 |
| 2012/0136829 A1* | 5/2012 | Darcy | G06F 17/30575 707/626 |
| 2012/0278578 A1* | 11/2012 | Castillo | G06F 12/02 711/165 |
| 2012/0323850 A1* | 12/2012 | Hildebrand | G06F 17/30578 707/624 |
| 2012/0324445 A1* | 12/2012 | Dow | G06F 9/45504 718/1 |
| 2012/0330711 A1* | 12/2012 | Jain | G06F 9/5072 705/7.23 |
| 2012/0331113 A1* | 12/2012 | Jain | G06F 9/5072 709/220 |
| 2013/0080703 A1* | 3/2013 | Kumagai | G06F 9/5072 711/117 |
| 2013/0111471 A1* | 5/2013 | Chandrasekaran | G06F 9/455 718/1 |
| 2013/0159998 A1* | 6/2013 | Cawlfield | G06F 9/45558 718/1 |
| 2013/0176136 A1* | 7/2013 | Yoshida | G06F 11/32 340/691.6 |
| 2013/0179550 A1 | 7/2013 | Kakizaki | |
| 2013/0198476 A1* | 8/2013 | Nakajima | G06F 3/0607 711/165 |
| 2013/0219043 A1* | 8/2013 | Steiner | G06F 9/4856 709/224 |
| 2013/0318526 A1* | 11/2013 | Conrad | G06F 9/45533 718/1 |
| 2013/0346973 A1* | 12/2013 | Oda | G06F 9/4856 718/1 |
| 2014/0075029 A1* | 3/2014 | Lipchuk | G06F 9/505 709/226 |
| 2014/0115164 A1* | 4/2014 | Kalyanaraman | H04L 29/08954 709/226 |
| 2014/0156853 A1* | 6/2014 | Suda | H04L 47/78 709/226 |
| 2015/0019733 A1* | 1/2015 | Suryanarayanan | H04L 41/0806 709/226 |
| 2015/0058863 A1* | 2/2015 | Karamanolis | G06F 9/5083 718/105 |
| 2015/0063127 A1* | 3/2015 | Sabetto | H04L 1/0033 370/245 |
| 2015/0113324 A1* | 4/2015 | Factor | H04L 67/1097 714/20 |
| 2015/0134723 A1* | 5/2015 | Kansal | H04L 67/1031 709/203 |
| 2015/0195141 A1* | 7/2015 | Luft | H04L 41/5006 709/223 |
| 2015/0195347 A1* | 7/2015 | Luft | H04L 67/10 709/203 |
| 2015/0234644 A1* | 8/2015 | Ramanathan | H04L 67/10 709/226 |
| 2015/0355924 A1* | 12/2015 | Holla | G06F 9/45558 718/1 |
| 2016/0004551 A1* | 1/2016 | Terayama | G06F 9/5011 718/1 |
| 2016/0092266 A1* | 3/2016 | Bavishi | G06F 9/4856 718/1 |
| 2016/0094477 A1* | 3/2016 | Bai | H04L 47/786 709/226 |
| 2016/0198003 A1* | 7/2016 | Luft | H04L 12/46 709/225 |
| 2016/0378537 A1* | 12/2016 | Zou | G06F 9/4856 718/1 |
| 2017/0048110 A1* | 2/2017 | Wu | H04L 41/12 |
| 2017/0097841 A1* | 4/2017 | Chang | G06F 9/45558 |
| 2017/0147399 A1* | 5/2017 | Cropper | G06F 9/4856 |
| 2017/0147672 A1* | 5/2017 | Arnold | G06F 17/30581 |
| 2017/0213257 A1* | 7/2017 | Murugesan | G06Q 30/0277 |
| 2017/0230310 A1* | 8/2017 | Takeuchi | H04L 1/0081 |
| 2017/0315839 A1* | 11/2017 | Zhang | G06F 9/4856 |

FOREIGN PATENT DOCUMENTS

| | | |
|---|---|---|
| JP | 2004-005068 | 1/2004 |
| JP | 2004-053696 | 2/2004 |
| JP | 2012-69056 A | 4/2012 |
| JP | 2013-41515 A | 2/2013 |

(56) References Cited

FOREIGN PATENT DOCUMENTS

| JP | 2014-6739 A | 1/2014 | | |
|---|---|---|---|---|
| WO | 2004/053696 | 6/2004 | | |
| WO | WO-2013027649 A1 * | 2/2013 | ............ | G06F 15/177 |
| WO | WO-2014169862 A1 * | 10/2014 | ............ | H04W 76/10 |
| WO | WO-2018106162 A1 * | 6/2018 | | |

OTHER PUBLICATIONS

Ping et al., "Towards Optimal Data Replication Across Data Centers," in Proceedings of the 2011 31st International Conference on Distributed Computing Systems Workshops (ICDCS Workshops), pp. 66-71 (6 pages), IEEE Computer Society (2011) (Year: 2011).*

Clark et al., "Live Migration of Virtual Machines", in Proceedings of the 2nd Symposium on Networked Systems Design and Implementation, May 2-4, 2005, Boston, MA, USA, 14 pages. (Year: 2005).*

Mahimkar et al., "Bandwidth on Demand for Inter-Data Center Communication", in Proceedings of the 10th ACM Workshop on Hot Topics in Networks, Article No. 24, Nov. 14-15, 2011, 6 pages. (Year: 2011).*

Beloglazov et al., "Energy-aware resource allocation heuristics for efficient management of data centers for Cloud computing", Future Generation Computer Systems 28 (2012): pp. 755-768. (Year: 2012).*

Japanese Office Action dated Feb. 19, 2019 for corresponding Japanese Patent Application No. 2015-158536, with English Translation, 5 pages.

* cited by examiner

FIG.2

| LINE | LINE QUALITY (PACKET LOSS RATE) [%] | DISTANCE [km] | BAND [Gbps] | LINE COST [THOUSAND YEN/ Gbps/MONTH] | DAYS REQUIRED FOR ACQUISITION [DAYS] |
|---|---|---|---|---|---|
| DATA CENTER A-DATA CENTER B | 0.01 | 1000 | 100 | 1000 | 30 |
| DATA CENTER A-DATA CENTER C | 0.01 | 5000 | 10 | 3000 | 60 |
| DATA CENTER A-DATA CENTER D | 0.00 | 7000 | 40 | 4000 | 60 |
| DATA CENTER B-DATA CENTER C | 0.02 | 5000 | 40 | 3000 | 60 |
| DATA CENTER B-DATA CENTER D | 0.01 | 6000 | 10 | 4000 | 60 |
| DATA CENTER C-DATA CENTER D | 0.00 | 7000 | 10 | 5000 | 45 |

FIG.3

| DC | COUNTRY | LOCATION | FACILITY LEVEL | OWNED FACILITY [m²] | FACILITY COST [THOUSAND YEN/ m²/MONTH] | PERSONNEL COST [THOUSAND YEN/ SYSTEM/MONTH] | OPERATING COST [THOUSAND YEN/ SYSTEM/MONTH] | DAYS REQUIRED FOR ACQUISITION [DAYS] |
|---|---|---|---|---|---|---|---|---|
| DATA CENTER A | JAPAN | TOKYO | Tier 1 | 10000 | 20 | 10 | 10 | 180 |
| DATA CENTER B | JAPAN | OSAKA | Tier 2 | 10000 | 10 | 8 | 10 | 120 |
| DATA CENTER C | THAILAND | BANGKOK | Tier 3 | 20000 | 5 | 3 | 5 | 120 |
| DATA CENTER D | AUSTRALIA | CAIRNS | Tier 1 | 30000 | 15 | 12 | 8 | 180 |

FIG.4

| DC | STORAGE RESOURCE | CAPACITY [TB] | STORAGE RESOURCE COST [THOUSAND YEN/TB/MONTH] | DAYS REQUIRED FOR ACQUISITION [DAYS] |
|---|---|---|---|---|
| DATA CENTER A | SSD | 100 | 100 | 30 |
| DATA CENTER A | HDD (HIGH SPEED, SMALL CAPACITY) | 5000 | 10 | 10 |
| DATA CENTER A | HDD (LOW SPEED, LARGE CAPACITY) | 10000 | 5 | 10 |
| DATA CENTER A | TAPE | 100000 | 2 | 20 |
| DATA CENTER B | SSD | 100 | 100 | 30 |
| DATA CENTER B | HDD (HIGH SPEED, SMALL CAPACITY) | 5000 | 10 | 10 |
| DATA CENTER B | HDD (LOW SPEED, LARGE CAPACITY) | 10000 | 5 | 10 |
| DATA CENTER B | TAPE | 100000 | 2 | 20 |

FIG.5

| SUBJECT | LOCATION | QUANTITY |
|---|---|---|
| LINE | DATA CENTER B-DATA CENTER C | 10 |
| HDD (HIGH SPEED, SMALL CAPACITY) | DATA CENTER A | 100 |
| TAPE | DATA CENTER C | 1000 |

FIG.6

| CLIENT | SYSTEM NAME | REPLICATION-DESTINATION DATA CENTER | LINE | REQUIRED BAND | RESOURCE | COST |
|---|---|---|---|---|---|---|
| COMPANY X | FILE SERVER SYSTEM | DATA CENTER B | DATA CENTER A– DATA CENTER B | 4 | STORAGE, HDD (HIGH SPEED), 20 TB | 80 |
| COMPANY X | ATTENDANCE MANAGEMENT SYSTEM | DATA CENTER B | DATA CENTER A– DATA CENTER B | 2 | STORAGE, HDD (LOW SPEED), 100 TB | 70 |
| COMPANY Y | ERP SYSTEM | DATA CENTER D | DATA CENTER C– DATA CENTER D | 1 | STORAGE, TAPE, 10 TB | 20 |
| COMPANY Y | MAIL SYSTEM | DATA CENTER D | DATA CENTER C– DATA CENTER D | 2 | STORAGE, HDD (LOW SPEED), 100 TB | 80 |
| COMPANY Y | AUTHENTICATION SYSTEM | DATA CENTER C | DATA CENTER C– DATA CENTER D | 1 | STORAGE, TAPE, 10 TB | 20 |
| COMPANY Z | EC SYSTEM | DATA CENTER A | DATA CENTER A– DATA CENTER B | 4 | STORAGE, HDD (HIGH SPEED), 100 TB | 150 |

FIG.7

| CLIENT | SYSTEM NAME | MAIN DC | DATA AMOUNT [TB] |
|---|---|---|---|
| COMPANY X | FILE SERVER SYSTEM | DATA CENTER A | 10 |
| COMPANY X | ATTENDANCE MANAGEMENT SYSTEM | DATA CENTER A | 5 |
| COMPANY Y | ERP SYSTEM | DATA CENTER C | 5 |
| COMPANY Y | MAIL SYSTEM | DATA CENTER C | 20 |
| COMPANY Y | AUTHENTICATION SYSTEM | DATA CENTER D | 1 |
| COMPANY Z | EC SYSTEM | DATA CENTER B | 30 |

FIG.8

| CLIENT | SYSTEM NAME | REPLICATION-DESTINATION DATA CENTER | RPO | BACKUP ENABLED TIME | DISTRIBUTION |
|---|---|---|---|---|---|
| COMPANY X | FILE SERVER SYSTEM | DOMESTIC CENTER | 3D | 0:00 TO 6:00 EVERYDAY | No |
| COMPANY X | ATTENDANCE MANAGEMENT SYSTEM | Any | 7D | 0:00 TO 6:00 EVERYDAY | Yes |
| COMPANY Y | ERP SYSTEM | Tier 2 OR HIGHER | 3D | Any | Yes |
| COMPANY Y | MAIL SYSTEM | Any | 2D | Any | Yes |
| COMPANY Y | AUTHENTICATION SYSTEM | BANGKOK (THAILAND) | 1D | Any | No |
| COMPANY Z | EC SYSTEM | Any | 1D | Any | Yes |

FIG.15

| PACKET LOSS RATE [%] | TRANSFER EFFICIENCY [%] |
|---|---|
| 0 | 80 |
| 0.01 | 70 |
| 0.02 | 68 |
| 0.1 | 30 |
| 1.0 | 35 |

FIG.16

| REPLICATION-DESTINATION DATA CENTER | LINE | LINE REQUIRED BAND | RESOURCE | COST | DIFFERENCE FROM CURRENT COST [THOUSAND YEN/ MONTH] |
|---|---|---|---|---|---|
| DATA CENTER B | DATA CENTER A– DATA CENTER B | 1 | STORAGE, TAPE, 100 TB | 50 | -10 |
| DATA CENTER B | DATA CENTER A– DATA CENTER B | 2 | STORAGE, HDD (LOW SPEED, LARGE CAPACITY), 100TB | 65 | +10 |
| DATA CENTER C | DATA CENTER A– DATA CENTER C | 2 | STORAGE, HDD (LOW SPEED, LARGE CAPACITY), 100TB | 70 | +15 |
| DATA CENTER C | DATA CENTER A– DATA CENTER C | 1 | STORAGE, TAPE, 100 TB | 55 | -5 |

SYSTEM-REPLICATION CONTROL APPARATUS AND SYSTEM-REPLICATION CONTROL METHOD

CROSS-REFERENCE TO RELATED APPLICATION

This application is based upon and claims the benefit of priority of the prior Japanese Patent Application No. 2015-158536, filed on Aug. 10, 2015, the entire contents of which are incorporated herein by reference.

FIELD

The embodiments discussed herein are related to a system-replication control apparatus and system-replication control method.

BACKGROUND

Some systems have a disaster recovery function for quick recovery from damage from a disaster and the like and for minimization of damage (Japanese Laid-open Patent Publication No. 2004-5068, International Publication Pamphlet No. WO 2004/053696).

However, in systems having a related disaster recovery function, a data center at which a system is replicated is determined only based on requirements for the disaster recovery function of each of the systems. Therefore, unevenness in the usage rate of resource is caused among data centers, and additional investment may be requested in some data centers.

SUMMARY

According to an aspect of the embodiments, a system-replication control apparatus includes: a processor that executes a process including: monitoring a use state of a resource in each of data centers; storing facility information indicating resources respectively held by the data centers and a use cost of the resources, and replication condition applied when each system is replicated in a resource of another data center; and selecting a resource composition that satisfies the replication condition and that costs lower than a currently-selected resource, as a replication destination of the system, from among available resources by referring to the use state of the resource obtained at the monitoring and the facility information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 depicts one example of a data configuration of line information;

FIG. 3 depicts one example of a data configuration of data-center (DC) facility information;

FIG. 4 depicts one example of a data configuration of DC resource information;

FIG. 5 depicts one example of a data configuration of planned acquisition information;

FIG. 6 depicts one example of a data configuration of current cost information;

FIG. 7 depicts one example of a data configuration of client system information;

FIG. 8 depicts one example of a data configuration of replication conditions;

FIG. 15 depicts one example of correspondence between a packet loss rate and a transfer efficiency;

FIG. 16 depicts one example of a list created by a replication processing unit;

DESCRIPTION OF EMBODIMENTS

Preferred embodiments will be explained with reference to accompanying drawings. The present invention is not limited to the embodiments. The respective embodiments can be combined appropriately within a range not causing a contradiction.

[a] First Embodiment

Entire Configuration

Figure 1:
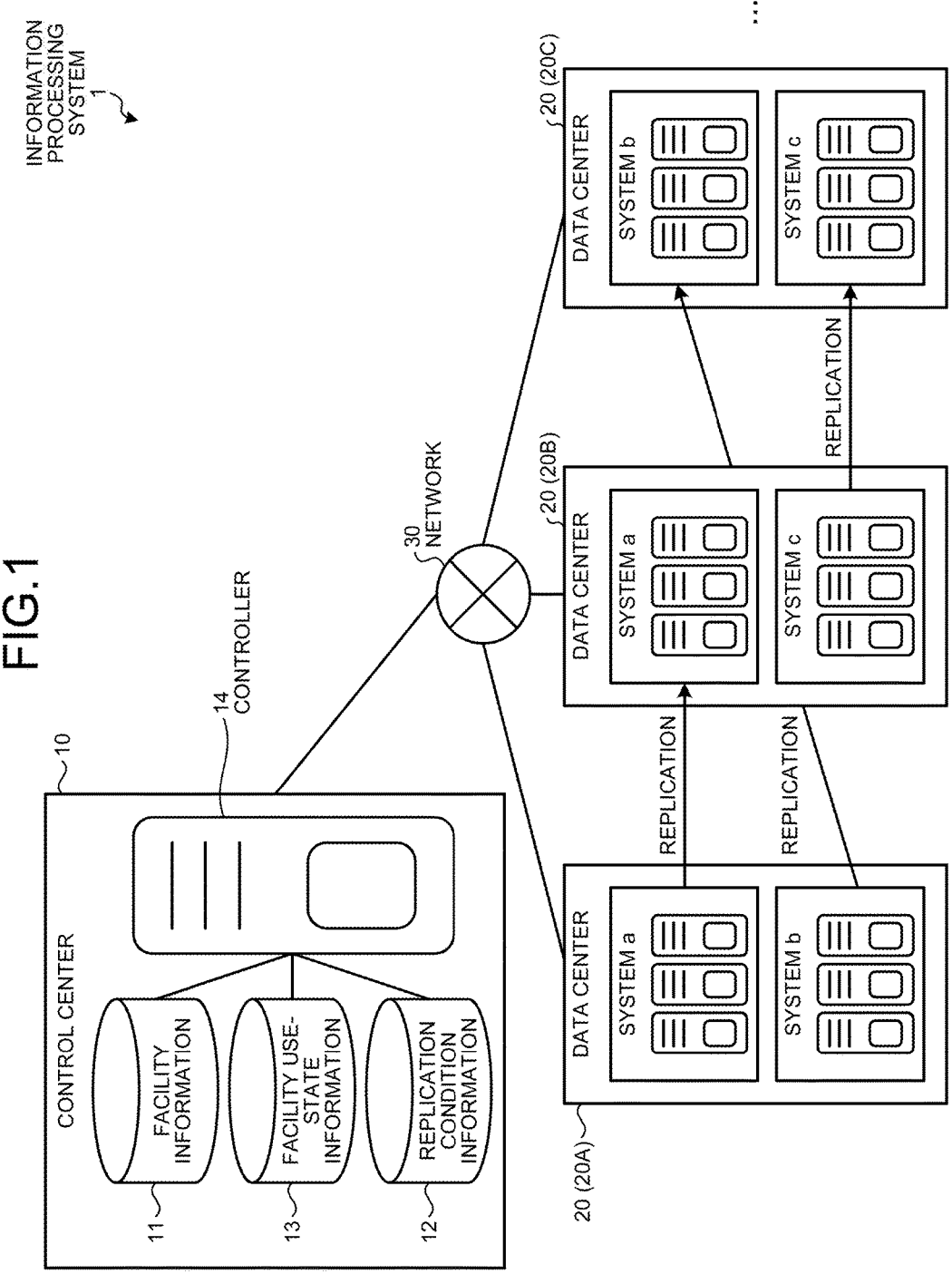
FIG. 1 depicts one example of a configuration of an information processing system according to a first embodiment.

FIG. 1 depicts one example of a configuration of an information processing system according to a first embodiment. As depicted in FIG. 1, an information processing system 1 includes a control center 10 and a plurality of data centers 20.

The control center 10 replicates a system, based on a use condition of facility (for example, a resource) of each data center 20 and replication conditions of the system, in the other data center 20 for disaster recovery (DR). For example, a system controller 14, which is one example of a system-replication control apparatus, replicates system a of a data center 20A in a data center 20B, and replicates system b of the data center 20A in a data center 20C. Furthermore, the controller 14 replicates system c of the data center 20B in the data center 20C.

The data center 20 has a resource such as a hard disk drive (HDD), and operates a system using the resource. The data centers 20 are geographically separated so as not to be affected when an abnormality occurs in either one of the data centers 20 due to a disaster or the like. The respective data centers 20 are connected to each other through a network 30. This network 30 may be either a dedicated line, or not. Although the example in FIG. 1 depicts three units of the data centers 20 (20A, 20B, 20C), the number of the data centers 20 may be an arbitrary number, at least two.

Configuration of Control Center

Subsequently, a configuration of the control center 10 is explained, referring to FIG. 1. The control center 10 includes facility information 11, replication condition information 12, facility use-state information 13, and the controller 14. The facility information 11, the replication condition information 12, and the facility use-state information 13 are stored in a storage device included in the control center 10.

Facility Information

The facility information 11 indicates facilities of each of the data centers 20. This facility information 11 includes, for example, information about resources in each of the data centers 20, information about a use cost of the resources, and the like. As a specific example, the facility information 11 includes line information, DC facility information, DC resource information, planned acquisition information, current cost information, and the like.

Line Information

The line information is information about lines connecting among the data centers 20. FIG. 2 depicts one example of a data configuration of the line information. As depicted in FIG. 2, the line information includes items of "line", "line quality (packet loss rate) (%)", "distance (km)", "band (Gbps)", "line cost (thousand yen/Gbps/month)", and "days requested for acquisition (days)".

The item of line is a region that stores information indicating which ones of the data centers 20 are connected by the line. The item of line quality is a region that stores information about the quality of the line, and for example, stores a value of a packet loss rate. The item of distance is a region that stores information about a length of the line. The item of available band is a region that stores information about a band of the line. The item of line cost is a region that stores information about cost of the line, and for example, stores line cost per 1 gigabit per second (Gbps) in a month. The item of days requested for acquisition is a region that stores a value indicating the number of days requested for acquiring the line.

The example depicted in FIG. 2 indicates that the packet loss rate of a line connecting between a data center A (data center 20A) and a data center B (data center 20B) is 0.01%. Moreover, it indicates that the length of the line is 1000 km, the band is 100 Gbps, the line cost is 1000 thousand yen/Gbps a month, and the days requested for acquiring the line is 30 days.

DC Facility Information

The DC facility information is information relating to facilities of each of the data centers 20. FIG. 3 depicts one example of a data configuration of the DC facility information. As depicted in FIG. 3, the DC facility information includes items of "DC", "country", "location", "facility level", and "owned facility (m²)". Furthermore, it includes items of "facility cost (thousand yen/m²/month)", "personnel cost (thousand yen/system/month)", "operating cost (thousand yen/system/month)", and "days requested for acquisition (days)".

The item of DC is a region that stores identification information of the data center 20. The item of country is a region that stores information about a country in which the data center 20 is located. The item of location is a region that stores information about a location (region) in which the data center 20 is located. The item of facility level is a region that stores information about the facility level of the data center 20. The item of owned facility is a region that stores information about an area of the owned facility of the data center 20. The item of facility cost is a region that stores information about a facility cost of the data center 20, and stores, for example, a facility cost per 1 square meter (m²) a month. The item of personnel cost is a region that stores information about a personnel cost of the data center 20, and for example, stores a personnel cost per system a month. The item of operating cost is a region that stores information about an operating cost of the data center 20, and for example, stores an operating cost per system a month. The item of days requested for acquisition is a region that stores a value indicating days requested for acquiring (installing) the data center 20.

The example depicted in FIG. 3 indicates that the data center A (data center 20A) is located in Tokyo, Japan, that the facility level is Tier1, and that the owned facility is 10000 m². Moreover, it indicates that the facility cost of the data center A (data center 20A) is 20 thousand yen/m² a month, that the personnel cost is 10 thousand yen/system a month, that the operating cost is 10 thousand yen/system a month, and that the days requested for acquisition is 180 days.

DC Resource Information

The DC resource information is information relating to resources held by each of the data centers 20. The resource here is a recording medium, such as an HDD, a solid state drive (SSD), and a magnetic tape, for example. FIG. 4 depicts one example of a data configuration of the DC resource information. As depicted in FIG. 4, the DC resource information includes items of "DC", "storage resource", "capacity (TB)", "storage resource cost (thousand yen/TB/month), and "days requested for acquisition (days)".

The item of DC is a region that stores identification information of the data center 20. The item of storage resource is a region that stores information about a type of resource (storage resource) held by the data center 20. The item of capacity is a region that stores information about a capacity of the storage resource. The item of storage resource cost is a region that stores information about a use cost of the storage resource, and for example, stores a use cost per 1 Tera byte (TB) a month. The item of days requested for acquisition is a region that stores a value indicating days requested for acquiring the storage resource.

The example depicted in FIG. 4 indicates that the capacity of an SSD of the data center A (data center 20A) is 100 TB, that the storage resource cost is 100 thousand yen/TB a month, and that the days requested for acquisition are 30 days.

(Planned Acquisition Information

The planned acquisition information is information relating to a resource to be acquired. FIG. 5 depicts one example of a data configuration of the planned acquisition information. As depicted in FIG. 5, the planned acquisition information includes items of "subject", "location", and "quantity".

The item of subject is a region that stores information about a type of resource to be acquired. The item of location is a region that stores information about a location to be installed with the resource. The item of quantity is a region that stores a quantity of the resource planned to be acquired.

The example depicted in FIG. 5 indicates that a line connecting between the data center B (data center 20B) and a data center C (data center 20C) is planned to be acquired in the quantity of "10".

Current Cost Information

The current cost information is information relating to a current use cost of each system. FIG. 6 depicts one example of a data configuration of the current cost information. As depicted in FIG. 6, the current cost information includes items of "client", "system name", "replication-destination data center", "line", "requested band", "resource", and "cost".

The item of client is a region that stores identification information of a client. The item of system name is a region that stores a system name of a system that is currently being used by the client. The item of replication-destination data center is a region that stores identification information of the data center 20 in which the system is replicated. The item of line is a region that stores information about a line that is used to replicate the system. The item of requested band is a region that stores information about a band requested for the line. The item of resource is a region that stores information about a resource used currently in the system. The item of cost is a region that stores information about a cost of the current system.

The example depicted in FIG. 6 indicates that the replication destination of a file server system of company X is the data center B (data center 20B), and that the line used for replication is the line connecting between the data center A (data center 20A) and the data center B (data center 20B). Furthermore, it indicates that the band requested for the line is "4", that the resource currently used by the file server system is a storage of a high-speed HDD, that the capacity is 20 TB, and that the cost is "80".

Replication Condition Information

The replication condition information 12 is information relating to replication conditions applied when each system is replicated in a resource of the other data center 20, and includes, for example, client system information in addition to replication conditions.

The client system information is information relating to a system that is currently used by each client, that is, a system of a replication source. FIG. 7 depicts one example of a data configuration of the client system information. As depicted in FIG. 7, the client system information includes items of "client", "system name", "main DC", and "data amount (TB)".

The item of client is a region that stores identification information of a client. The item of system name is a region that stores information about a system name of a system currently been used by the client. The item of main DC is a region that stores identification information of the data center 20 used as a main center in the system. The item of data amount is a region that stores a data amount of the system.

The example depicted in FIG. 7 indicates that the data center 20 that is used as a main center in the file server system of the company X is the data center A (data center 20A), and the data amount is 10 TB.

The replication conditions are information relating to replication conditions applied when each system is replicated in a resource of the other data center. FIG. 8 depicts one example of a data configuration of the replication conditions. As depicted in FIG. 8, the replication conditions include items of "client", "system name", "replication-destination data center", "backup enabled time", and "distribution".

The item of client is a region that stores identification information of a client. The item of system name is a region that stores a system name of a system currently been used by the client. The item of replication-destination data center is a region that stores conditions for a data center in which the system is replicated. The item of recovery point objective (RPO) is a region that stores RPO, that is, a target value indicating up to what point of time data is guaranteed at the time of recovery. The item of backup enabled time is a region that stores information about a time band in which system backup (replication) is enabled. The item of distribution is a region that stores information indicating whether the system can be distributed in the plurality of data centers 20 when replicated.

The example depicted in FIG. 8 indicates that the data center 20 in which the file server system of the company X is replicated is either the data centers 20 located domestically, and that the RPO is 3D (3 days). Furthermore, it indicates that the time band in which backup (replication) of the system is enabled is 0:00 to 6:00 every day, and that the system is not distributed in the plurality of data centers 20.

Facility Use-State Information

The facility use-state information 13 is information indicating a use state of facilities (for example, a line, a data center, a resource, and the like) of each of the data centers 20. This facility use-state information 13 includes information such as a line usage rate, a facility usage rate, and a resource usage rate. This facility use-state information 13 is updated by the controller 14 at any time.

Figure 9:
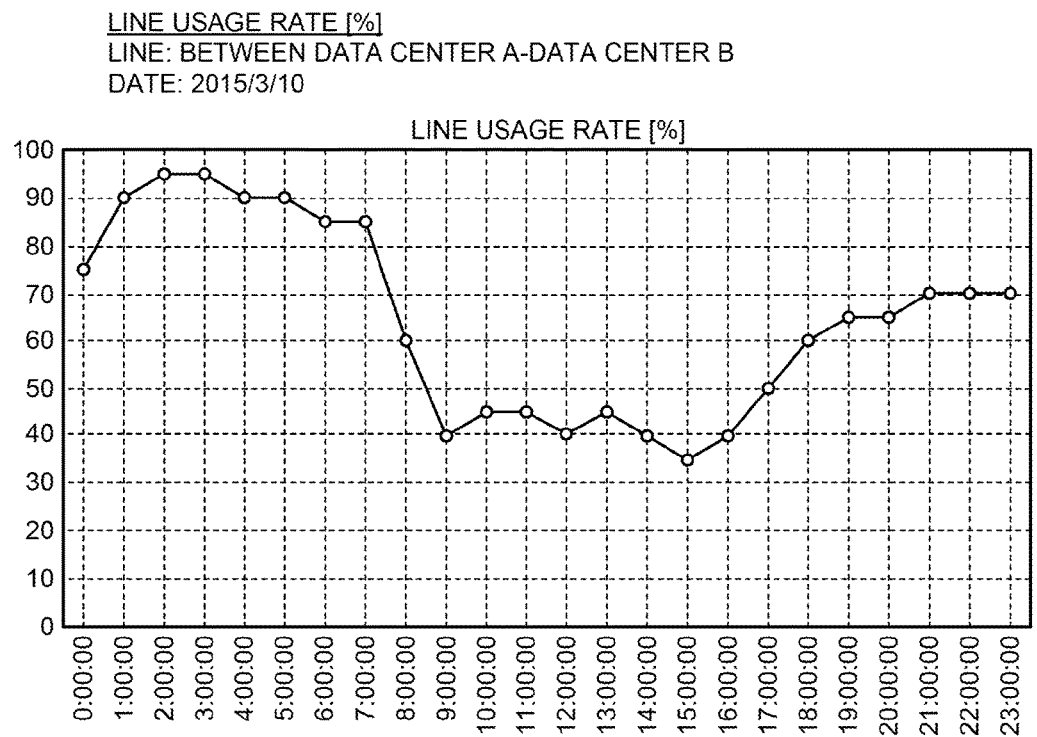
FIG. 9 depicts one example of a line usage rate of facility use-state information.

FIG. 9 depicts one example of the line usage rate of the facility use-state information. In this example, values of the line usage rate of the line connecting the data center A (data center 20A) and the data center B (data center 20B) that is measured every one hour on 2015 Mar. 10 are indicated.

Figure 10:
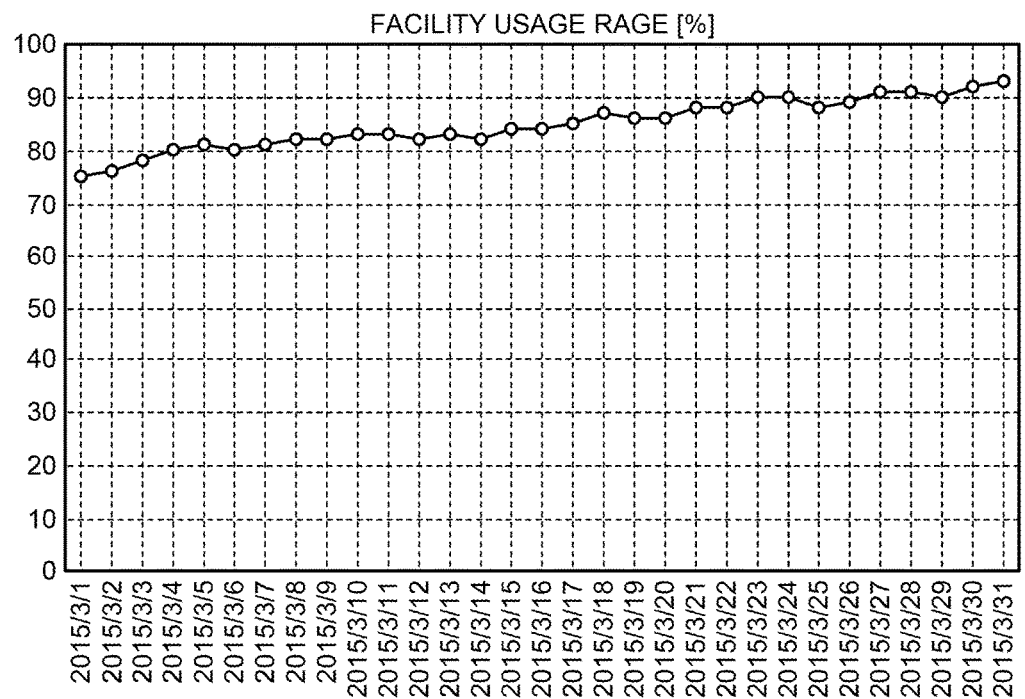
FIG. 10 depicts one example of facility usage rate of the facility use-state information.

FIG. 10 depicts one example of the facility usage rate of the facility use-state information. In this example, values of the facility usage rate of the data center A (data center 20A) measured every day in 2015 March are indicated.

Figure 11:
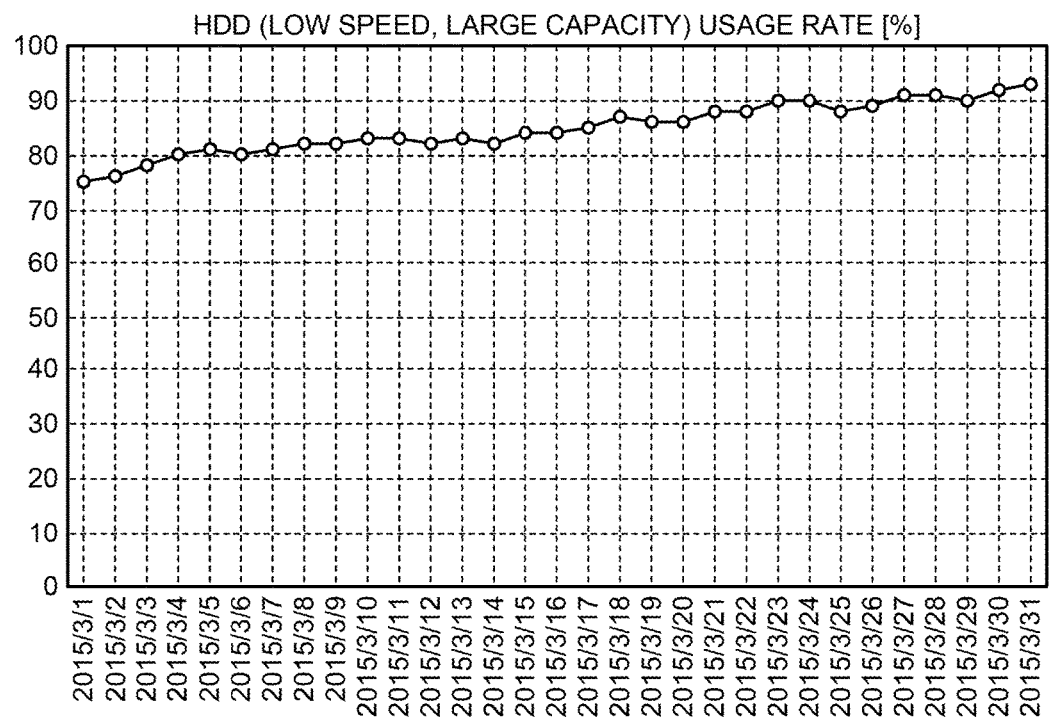
FIG. 11 depicts one example of a resource usage rate of the facility use-state information.

FIG. 11 depicts one example of the resource usage rate of the facility use-state information. In this example, values of the usage rate of a storage of a low-speed high-capacity HDD of the data center A (data center 20A) measured every day in 2015 March are indicated.

Controller

Figure 12:
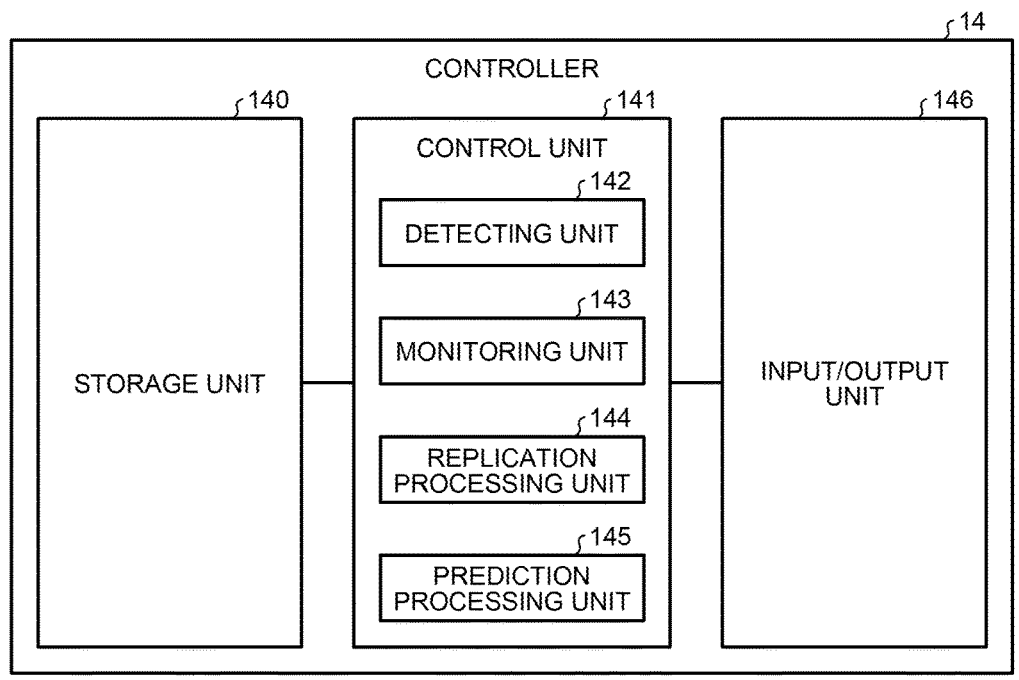
FIG. 12 depicts one example of a configuration of a controller.

Next, a configuration of the controller 14 is explained. FIG. 12 depicts one example of a configuration of the controller. As depicted in FIG. 12, the controller 14 includes a storage unit 140, a control unit 141, and an input/output unit 146. The controller 14 may include various kinds of functional units that are included in a known computer, in addition to the functional units depicted in FIG. 12. For example, the controller 14 may include a display unit that displays various kinds of information, and an input unit to input various kinds of information.

The storage unit 140 is a storage device that stores various kinds of data. For example, the storage unit 140 is a storage device such as a hard disk, an SSD, and an optical disk. The storage unit 140 may be a rewritable semiconductor memory, such as a random access memory (RAM), a flash memory, and a nonvolatile static random access memory (NVSRAM). This storage unit 140 stores an operating system (OS) and various kinds of programs executed by the control unit 141. For example, the storage unit 140 stores various kinds of programs including a program that implements replication-destination optimization processing described later, and the like.

The control unit 141 includes a detecting unit 142, a monitoring unit 143, a replication processing unit 144, and a prediction processing unit 145.

The detecting unit 142 detects updates of the facility information 11 and the replication condition information 12 through the input/output unit 146.

The monitoring unit 143 monitors a use state of a facility in each of the data centers 20 through the input/output unit 146, and writes the monitoring result in the facility use-state information 13. For example, the monitoring unit 143 performs the monitoring described above when the detecting unit 142 detects an update of either the facility information 11 or the replication condition information 12, and writes the monitoring result in the facility use-state information 13.

The replication processing unit 144 refers to the facility information 11 and the facility use-state information 13, and selects resource compositions that satisfy the replication conditions of the system indicated in the replication condition information 12, from among available resources of the respective data centers 20. The replication processing unit 144 then selects a resource composition that achieves the largest cost reduction relative to a current replication destination resource, as a replication destination of the system. Thereafter, the replication processing unit 144 replicates the system in the selected replication destination. Details about the replication processing unit 144 are described later with a flowchart.

The prediction processing unit 145 determines whether a resource shortage occurs after replication of the system into the resource of the composition selected by the replication processing unit 144. For example, the prediction processing unit 145 refers to a use history of the facility that is acquired from the facility use-state information 13 after replication of the system into the resource of the composition selected by the replication processing unit 144, to predict the use condition of the facility. The prediction processing unit 145 refers to a result of the prediction and future acquisition plans of each resource, to determine whether a resource shortage is to occur. Details about this prediction processing unit 145 are also described later with a flowchart.

The input/output unit 146 serves as an interface when the control unit 141 performs replication of each of the data centers 20 through the network 30, or reads or updates information, such as the facility information 11, the replication condition information 12, and the facility use-state information 13.

As described above, the control unit 141 selects a resource composition that satisfies the replication conditions and achieves the largest cost reduction from a current replication-destination resource as a replication destination of a system, from among available resources of the respective data centers 20. For example, an administrator of the control center 10 or the like sets the cost of the data center 20 or a resource with a low usage rate to low in the facility information 11. This makes a resource with a relatively low use rate more likely to be selected by the control unit 141 as a replication destination of a system, and enables to reduce the unevenness in the usage rate of resources among the data centers 20. As a result, additional investment due to a resource shortage in each of the data centers 20 is suppressed, and the operating cost of the data centers 20 can be reduced.

Processing Flow

Figure 13:
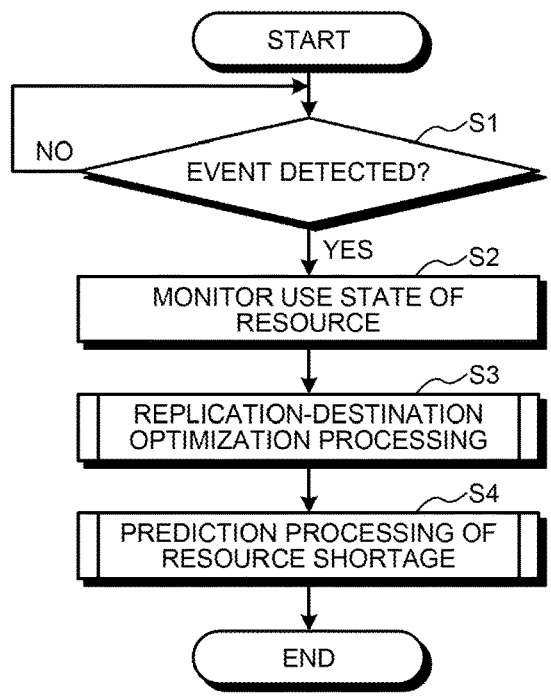
FIG. 13 is a flowchart indicating one example of a procedure of processing performed by the controller.

Next, processing performed by the controller 14 depicted in FIG. 12 is explained using FIG. 13. FIG. 13 is a flowchart indicating one example of a procedure of the processing performed by the controller.

As indicated in FIG. 13, when the detecting unit 142 of the controller 14 detects an event (S1: YES), the monitoring unit 143 monitors use states of resources of the respective data centers 20 (S2). The monitoring unit 143 then updates the facility use-state information 13 based on the monitoring result. The event herein is, for example, an update of the facility information 11 or the replication condition information 12, a periodical monitoring moment of use states of facilities, and the like. When the detecting unit 142 detects no events (S1: NO), it returns to S1.

Following S2, the replication processing unit 144 performs the replication-destination optimization processing of each system (S3). Specifically, the replication processing unit 144 refers to the facility information 11 and the facility use-state information 13, and selects a resource composition that satisfies replication conditions of a system, from among available resources in each of the data centers 20. The replication processing unit 144 replicates the system in the data center 20 that has the selected resource composition. The replication is performed in accordance with the replication conditions of the system. Details of the replication-destination optimization processing at S3 are described later using FIG. 14.

Subsequently, the prediction processing unit 145 performs resource-shortage prediction processing after the replication-destination optimization processing at S3 (S4). That is, the prediction processing unit 145 determines whether a resource shortage occurs after replication of the system into the resource of the composition selected by the replication processing unit 144. Details of the resource-shortage prediction processing at S4 are described later using FIG. 17.

Replication-Destination Optimization Processing

Figure 14:
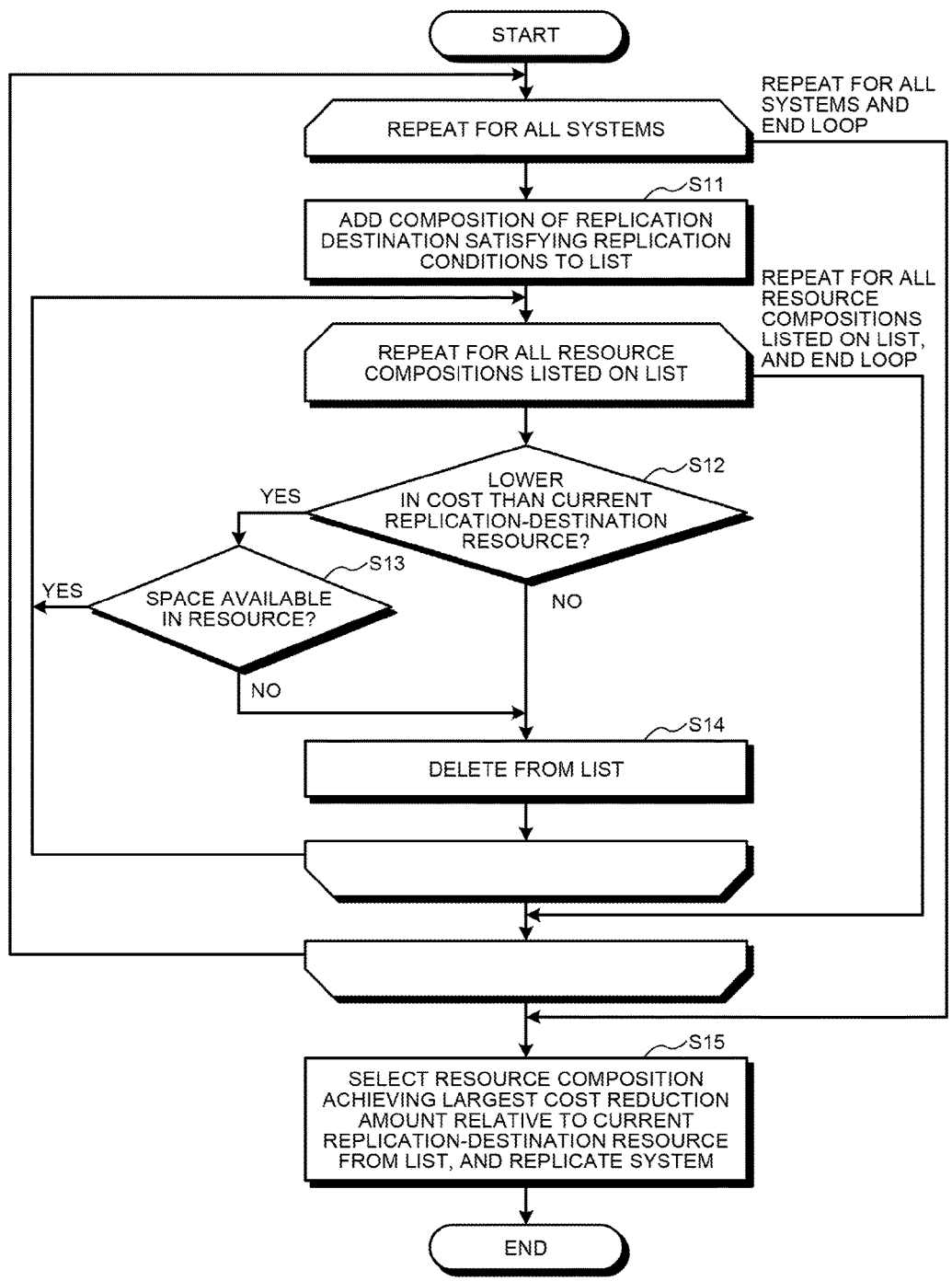
FIG. 14 is a flowchart indicating one example of a procedure of replication-destination optimization processing.

Next, details of the replication-destination optimization processing at S3 in FIG. 13 are explained using FIG. 14. FIG. 14 is a flowchart indicating one example of a procedure of the replication-destination optimization processing.

As indicated in FIG. 14, the replication processing unit 144 performs the following processing for each of the systems. Specifically, the replication processing unit 144 refers to the replication condition information 12, selects an unprocessed system from among all systems, and adds a composition of replication destination resources that satisfies replication conditions of the system to a list (S11). The replication processing unit 144 then performs the following processing for each of resource compositions listed on the list.

Specifically, the replication processing unit 144 selects an unprocessed composition from among the resource compositions on the list, refers to the facility information and the facility use-state information 13, and determines whether the composition is lower in cost than a current replication-destination resource (S12). When the composition is not lower in cost than the current replication-destination resource (S12: NO), the replication processing unit 144 deletes the composition from the list.

Moreover, also when determining that the composition is lower in cost than the current replication-destination resource (S12: YES) but there will be no space in future from the use state of the resources (S13: NO), the replication processing unit 144 deletes the composition from the list (S14). That is, the replication processing unit 144 leaves the composition in the list when the composition is lower in cost than the current replication-destination resource (S12: YES) and there will be a space in the resource (S13: YES). The replication processing unit 144 repeats the above processing for each of the resource compositions listed on the list, and then ends the loop when completed.

The replication processing unit 144 repeats the above processing for all of the systems to end the loop, selects a resource composition having the largest cost reduction amount thereamong relative to the current replication-destination resource, and replicates the system therein (S15).

Thus, the replication processing unit 144 can replicate a system in a resource of the composition that satisfies replication conditions, and that has the largest cost reduction amount relative to the current replication-destination resource among available resources of the respective data centers 20.

Specific Example of Replication-Destination Optimization Processing

Next, the above replication-destination optimization processing is explained with a specific example. Optimization of a replication destination for a file server system of the company X by the replication processing unit 144 is explained as an example.

First, in the replication condition information 12 (refer to FIG. 7 and FIG. 8), the main data center of the file server system of the company X is the data center and the replication-destination data center is a "domestic center", and the data amount is "10 (TB)". Moreover, in the DC facility information of the facility information 11 (refer to FIG. 3), a domestic data center other than the data center A is the data center B only. Therefore, the replication processing unit 144 determines the replication destination of the file server system of the company X to the data center B (data center 20B).

Next, in the replication condition information 12 (refer to FIG. 8), the RPO of the file server system of the company X is "3D", and the backup enable time is "0:00 to 6:00 everyday". Therefore, the replication processing unit 144 determines that the controller 14 has to transfer difference data for three days of the file server system of the company X to the replication destination (data center B) in 18 hours.

For the data amount of the difference data of the file server system of the company X, if a past actual value is available, the actual value is used. If an actual value is not available, for example, a maximum value of the data amount of difference data that is produced in a general file server system is used for estimation. It is known that the amount of difference data produced per day in a general file server system is about 1% to 10% of the total data amount. Therefore, the replication processing unit 144 acquires the amount of difference data=10 TB*0.10*3 days=3 TB, from the total data amount (10 TB).

Subsequently, the replication processing unit 144 acquires a line band requested for replicating the file server system of the company X. As described above, the controller 14 has to transfer difference data of the file server system of the company X in the data amount (3 TB) within 18 hours. Therefore, a requested effective line band=(3*1000*1000) MB/(18*60*60) seconds≈370 Mbps is acquired. That is, a line band having a performance achieving 370 Mbps or more in an effective value is requested.

Next, in the facility information 11 (refer to FIG. 2), the line quality (packet loss rate) of the line between the data center A and the data center B is "0.01%". Furthermore, as described above, the requested effective line band is "370 Mbps". Therefore, the replication processing unit 144 calculates a line band requested to acquire the effective line band "370 Mbps" with the line quality (packet loss rate) "0.01%" between the data center A and the data center B.

For the requested band, if a past actual value is available, the actual value is used. If an actual value is not available, the requested line band is estimated, for example, from relation between a general packet loss rate and a transfer efficiency. FIG. 15 depicts one example of correspondence between a packet loss rate and a transfer efficiency. For example, in the correspondence between a packet loss rate and a transfer efficiency indicated in FIG. 15, the transfer efficiency of the line quality (packet loss rate) "0.01%" is "70%". Therefore, the replication processing unit 144 acquires 370 Mbps/0.7≈530 Mbps as the effective line band requested to acquire the effective line band "370 Mbps". Rounded up to 100 Mbps, the requested line band is 600 Mbps.

Subsequently, the replication processing unit 144 refers to the DC resource information (refer to FIG. 4) of the facility information 11, and selects a resource that has a performance of 600 Mbps or higher when 100 TB of data is stored, from among resources (storage resources) of the data center B. For example, the replication processing unit 144 refers to the DC resource information (refer to FIG. 4) of the facility information 11, and selects resources of "tape" and "HDD (low speed, large capacity)" from among the resources (storage resources) of the data center B. When distribution of replication destination resources is indicated as "YES" in the replication conditions (refer to FIG. 8), the replication processing unit 144 may select resources of the plurality of data centers 20. The replication processing unit 144 adds the selected resources to the list.

The replication processing unit 144 refers to the line information (refer to FIG. 2), the DC facility information (refer to FIG. 3), and the DC resource information (refer to FIG. 4) of the facility information 11, and calculates a cost when a resource composition listed on the list acquired by the above processing is used. The replication processing unit 144 then refers to the current cost information (refer to FIG. 6) in the facility information 11, and determines whether the calculated cost is lower than that of the current replication-destination resource (refer to S12 in FIG. 14). When the calculated cost is lower than that of the current replication-destination resource (S12: YES), the replication processing unit 144 refers to the facility use-state information 13 (refer to FIG. 9 to FIG. 11), and determines whether there is a space in the resource (S13). When the cost calculated at S12 is higher than that of the current replication-destination resource (S12: NO), the replication processing unit 144 deletes the resource composition from the list (S14). Moreover, also when determining that there is no space at S13 (S13: NO), the replication processing unit 144 deletes the resource composition from the list (S14).

FIG. 16 depicts one example of the list created by the replication processing unit. As indicated in FIG. 16, the list includes items of "replication-destination data center", "line", "requested band", "resource", "cost", and "difference from current cost (thousand yen/month)". The example in FIG. 16 indicates that when the replication destination is the data center B, the line between the data center A and the data center B is used, and the requested band is "1" or more, the selectable resource is "storage, tape, 100 TB". Moreover, it indicates that the cost in this case is "50", and the difference from the current cost is "−10 (thousand/month)". Furthermore, it indicates that when the replication destination is the data center B, the line between the data center A and the data center B is used, and the requested band is "2" or more, the selectable resource is "storage, HDD (low speed, large capacity), 100 TB". Moreover, the cost in this case is "65", and the difference from the current cost is "+10 (thousand yen/month)".

As the replication processing unit 144 deletes a resource higher in cost than the current replication-destination resource from the list at S14 in FIG. 14 described above, for example, entries indicated by a reference number 101 and a reference number 102 in FIG. 16 are deleted in the end.

After repeating the above processing, the replication processing unit 144 selects a resource composition having the largest cost reduction amount from the list (S15 in FIG. 14). For example, the replication processing unit 144 refers to values of the "difference from current cost" in the list (refer to FIG. 16), and selects a resource composition indicated by a reference number 103 having the largest cost reduction (−10).

Thus, the replication processing unit 144 can select a composition that satisfies the replication conditions and that has the largest cost reduction relative to the current replication-destination system from among available resources in the respective data centers 20, as a replication destination of the system.

Resource-Shortage Prediction Processing

Figure 17:
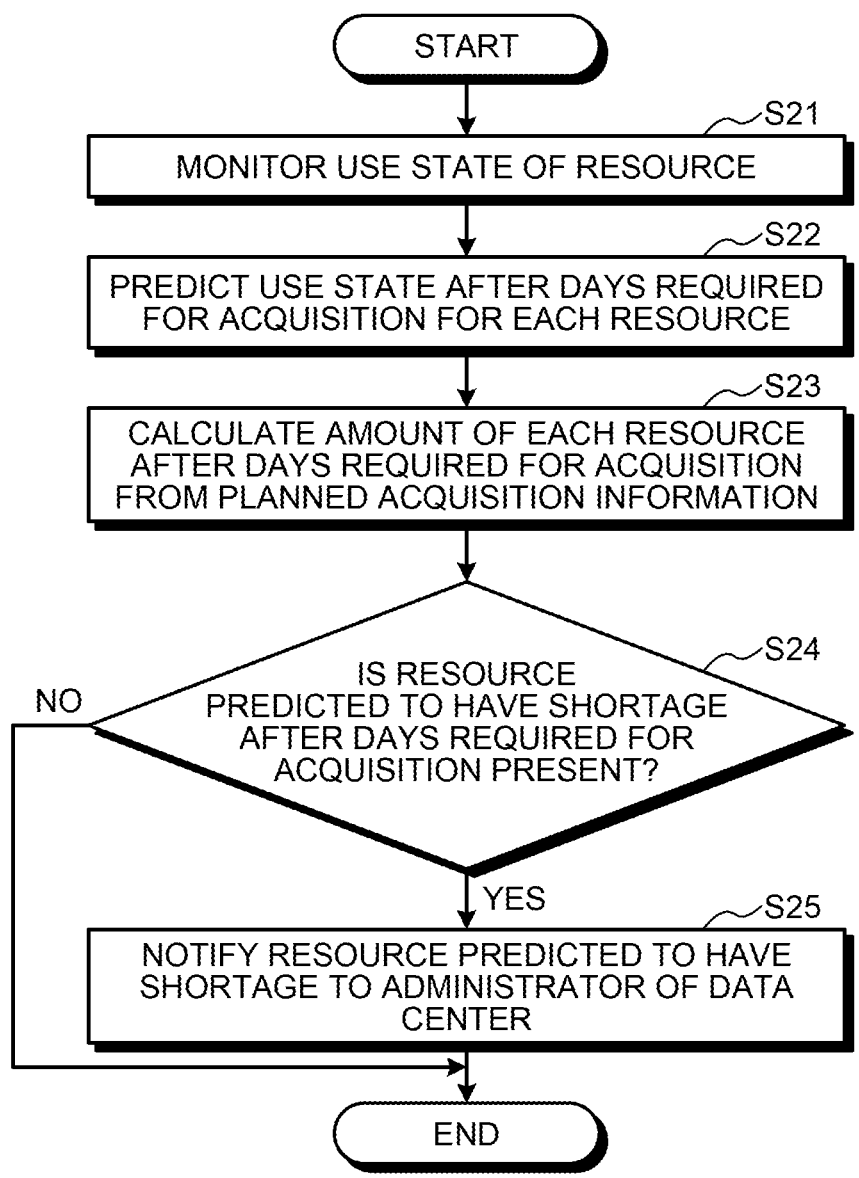
FIG. 17 is a flowchart indicating one example of a procedure of resource-shortage prediction processing.

Next, details of the resource-shortage prediction processing at S4 in FIG. 13 are explained using FIG. 17. FIG. 17 is a flowchart indicating one example of a procedure of the resource-shortage prediction processing.

As indicated in FIG. 17, the monitoring unit 143 monitors a use state of resources of the respective data centers after the replication-destination optimization processing at S4 in FIG. 13 (S21). The monitoring unit 143 then updates the facility use-state information 13 based on the monitoring result.

Following S21, the prediction processing unit 145 refers to the facility use-state information 13 updated at S21 and the days requested for acquisition (refer to FIG. 2 to FIG. 4) of each resource in the facility information 11, and predicts a use state after the days requested for acquisition of each resource (S22). Furthermore, the prediction processing unit 145 calculates an amount of each resource acquired after the days requested for acquisition from the planned acquisition information (refer to FIG. 5) of the facility information 11 (S23).

Following S23, the prediction processing unit 145 determines whether there is a resource predicted to have a shortage after the days requested for acquisition of the resource passes among resources (S24). Specifically, the prediction processing unit 145 compares the amount of each resource that is to be acquired after the days requested for acquisition calculated at S23 with the use state after the days requested for acquisition of each resource calculated at S22, to determine whether there is a resource to have a shortage. That is, the prediction processing unit 145 determines whether there is a resource predicted to have a resource shortage in future even if a resource is newly acquired.

For example, at S24, the prediction processing unit 145 determines that there will be a shortage in a resource when the usage rate of the resource predicted at S22 relative to the amount of resource to be acquired after the days requested for acquisition that is calculated at S23 is equal to or higher than a predetermined threshold (for example, 90%). The above threshold can be set arbitrarily by an administrator of the data center 20, or the like.

When the prediction processing unit 145 determines that there is a resource predicted to have a shortage at S24 (S24: YES), the prediction processing unit 145 notifies the resource predicted to have a shortage to an administrator of the data center 20 (S25). For example, the prediction processing unit 145 notifies the resource predicted to have a shortage to an administrator of the data center 20 having the resource predicted to have a shortage. On the other hand, when the prediction processing unit 145 determines that there is no resource predicted to have a shortage at S24 (S24: NO), the processing is ended.

Thus, the prediction processing unit 145 can notify a resource predicted to have a shortage after the replication-destination optimization processing of a system to an administrator of the data center 20. As a result, when addition of a resource is requested after the replication-destination optimization processing, the administrator of the data center 20 can be aware of the fact.

Effect

As described above, the controller 14 selects a resource composition that satisfies replication conditions and that has the largest cost reduction amount relative to the current replication-destination resource from among available resources of the respective data center 20, as the replication destination of a system. For example, an administrator of the control center 10, or the like sets a cost low for the data center 20 or a resource having a low usage rate in the facility information 11. This enables a resource having a relatively low usage rate to be likely to be selected as a replication destination of a system in the controller 14, and to reduce the unevenness in the usage rate of resources among the data centers 20. As a result, additional investment due to a resource shortage of each of the data centers 20 can be suppressed, and the operating cost of each of the data centers 20 can be reduced.

Moreover, the monitoring unit 143 monitors a use state of resources of the respective data centers 20 when either of the facility information 11 and the replication condition information 12 is updated, besides monitoring in a predetermined period. The replication processing unit 144 performs the replication-destination optimization processing of a system based on the use state of resources after the update of each information. Thus, the replication processing unit 144 can perform the replication-destination optimization processing of the system swiftly based on the updated information and the use state of the resources when the facility information 11 or the replication condition information 12 is updated.

Furthermore, the prediction processing unit 145 can notify a resource predicted to have a shortage after the replication-destination optimization processing of the system, to an administrator of the data center 20. This enables the administrator to take measures against a resource shortage after the replication-destination optimization processing of the system promptly. Moreover, when the prediction processing unit 145 performs the above prediction, by taking the days requested for acquisition and the resource amount to be acquired into consideration, a resource shortage can be predicted further accurately.

[b] Second Embodiment

The embodiment of the disclosed apparatus has been explained, but the disclosed technique can be implemented by various different embodiments other than the embodiment described above. Other embodiments included in the present invention are explained below.

For example, while the replication processing unit 144 determines a resource composition having the largest cost reduction relative to a current replication-destination resource as a replication destination of a system in the above embodiment, the replication processing unit 144 may present a resource composition with a cost lower than that of the current replication-destination resource.

Moreover, while the monitoring unit 143 monitors a use state of resources of the respective data centers 20 every predetermined period or when either of the facility information 11 and the replication condition information 12 is updated, the monitoring unit 143 may monitor at other times.

Furthermore, when performing the prediction processing of a resource shortage, the prediction processing unit 145 may perform the prediction processing without taking the planned acquisition information (refer to FIG. 5) into consideration.

Moreover, while it has been explained that the prediction processing unit 145 predicts a resource shortage based on a use state of resources of the respective data centers 20 after replication of a system by the replication processing unit 144, it is not limited thereto. For example, a use state of resource of the respective data centers 20 when a system is replicated into a replication destination selected by the replication processing unit 144 may be simulated, and the prediction of a resource shortage may be performed based on a result of the simulation.

Furthermore, the facility information 11, the replication condition information 12, and the facility use-state information 13 may be stored in a storage device located externally from the controller 14, or may be stored in the storage unit 140 of the controller 14.

Moreover, the illustrated respective components of the respective devices are of a functional concept, and are not necessarily required to be physically configured as illustrated. That is, a specific form of distribution and integration of the respective devices is not limited to the one depicted, and all or a part thereof may be configured distributing and integrating functionally or physically in an arbitrary unit, according to various kinds of loads and a use condition. For example, the detecting unit 142, the monitoring unit 143, the replication processing unit 144, and the prediction processing unit 145 may be integrated. Furthermore, processing of each unit may be distributed to a plurality of processing units. Moreover, as for the respective processing functions performed by the respective processing units, all or a part thereof may be implemented by a central processing unit (CPU) and a program that is analyzed and executed by the CPU, or by hardware by a wired logic.

Control Program

Figure 18:
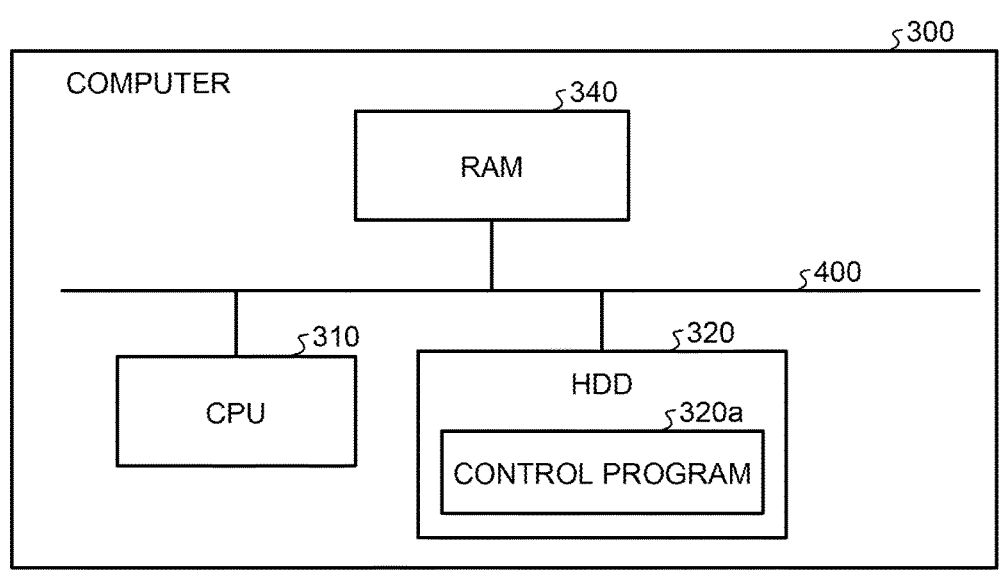
FIG. 18 depicts a computer that executes a control program.

Furthermore, various kinds of processing explained in the above embodiments can be implemented by executing a program prepared in advance by a computer system such as a personal computer and a work station. Therefore, in the following, one example of a computer system that executes a program having functions similar to the above embodiments is explained. FIG. 18 depicts a computer that executes a control program.

As depicted in FIG. 18, a computer 300 includes a CPU 310, an HDD 320, and a RAM 340. The respective components 300 to 340 are connected to each other through a bus 400.

In the HDD 320, a control program 320a that has functions similar to the detecting unit 142, the monitoring unit 143, the replication processing unit 144, and the prediction processing unit 145 described above is stored in advance. The control program 320a may be divided appropriately.

Moreover, the HDD 320 stores various kinds of information. For example, the HDD 320 stores an OS and various data requested for the replication processing of a system.

By reading and executing the control program 320a from the HDD 320 by the CPU 310, similar operations as the respective processing units of the embodiments are performed. That is, the control program 320a acts similarly to the detecting unit 142, the monitoring unit 143, the replication processing unit 144, and the prediction processing unit 145.

The control program 320a described above is not necessarily required to be stored in the HDD 320 from the beginning.

For example, the program is stored in a "transportable physical medium" such as a flexible disk (FD), a compact disk read-only memory (CD-ROM), a digital versatile disk (DVD), an optical magnetic disk, and an integrated circuit (IC) card. The computer 300 may be configured to read the program from such a medium to execute it.

Alternatively, the program is stored in "another computer (or server)" that is connected to the computer 300 through a network such as a public network, the Internet, a local area network (LAN), and a wide area network (WAN). The computer 300 may be configured to read the program from such a computer to execute it.

According to an embodiment, an operating cost of a data center can be reduced.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system-replication control apparatus comprising:
   a storage that stores facility information indicating resources respectively held by data centers and a use cost of the resources, and replication condition applied when each system is replicated in a resource of another data center; and
   a hardware processor that is coupled to the storage and executes a process including:
   monitoring a use state of the resources in each of the data centers;
   selecting a resource that satisfies the replication condition from among the resources by referring to the facility information;
   calculating a cost for a case in which the selected resource is used as a replication destination of the system;
   first determining whether the calculated cost is lower than a current cost of a current replication-destination resource;
   second determining whether there is a space in the selected resource in future, when the calculated cost is determined to be lower than the current cost; and
   replicating the system in the selected resource, when there is a space in the selected resource,
   the selecting includes acquiring a line band for transferring the system based on line quality between the data centers, and selecting the resource that has a performance meeting the acquired line band.

2. The system-replication control apparatus according to claim 1, wherein the selecting includes selecting a resource that has a largest reduction in the use cost as the replication destination of the system when more than one resource that costs lower than a currently-selected resource is present.

3. The system-replication control apparatus according to claim 1, wherein the monitoring includes acquiring the use state of the resources from each of the data centers every predetermined time, or when either one of the facility information and the replication condition is updated.

4. The system-replication control apparatus according to claim 1, wherein the second determining includes predicting a use state of the resources in a case in which the system is replicated in the selected resource by referring to a use history of the resources that is acquired from the use state of the resources, and determining whether a shortage occurs in the resources in future.

5. The system-replication control apparatus according to claim 4, wherein
the facility information further includes days requested for acquisition of the resources and an amount of the resources to be acquired, and
the second determining includes determining whether the shortage occurs in the resources in future even when the resources are acquired, based on a result of the prediction of the use state of the resources and the facility information.

6. The system-replication control apparatus according to claim 4, wherein the predicting further includes notifying a result of the determination when determining that the shortage occurs in the resources.

7. A system-replication control method comprising:
monitoring a use state of resources respectively held by data centers, by a processor;
selecting a resource that satisfies replication condition applied when each system is replicated in a resource of another data center, from among the resources, by referring to facility information indicating the resources, by the processor;
calculating a cost for a case in which the selected resource is used as a replication destination of the system, by the processor;
first determining whether the calculated cost is lower than a current cost of a current replication-destination resource, by the processor;
second determining whether there is a space in the selected resource in future, when the calculated cost is determined to be lower than the current cost, by the processor; and
replicating the system in the selected resource, when there is a space in the selected resource,
the selecting includes acquiring a line band for transferring the system based on line quality between the data centers, and selecting the resource that has a performance meeting the acquired line band.

* * * * *